UNITED STATES PATENT OFFICE.

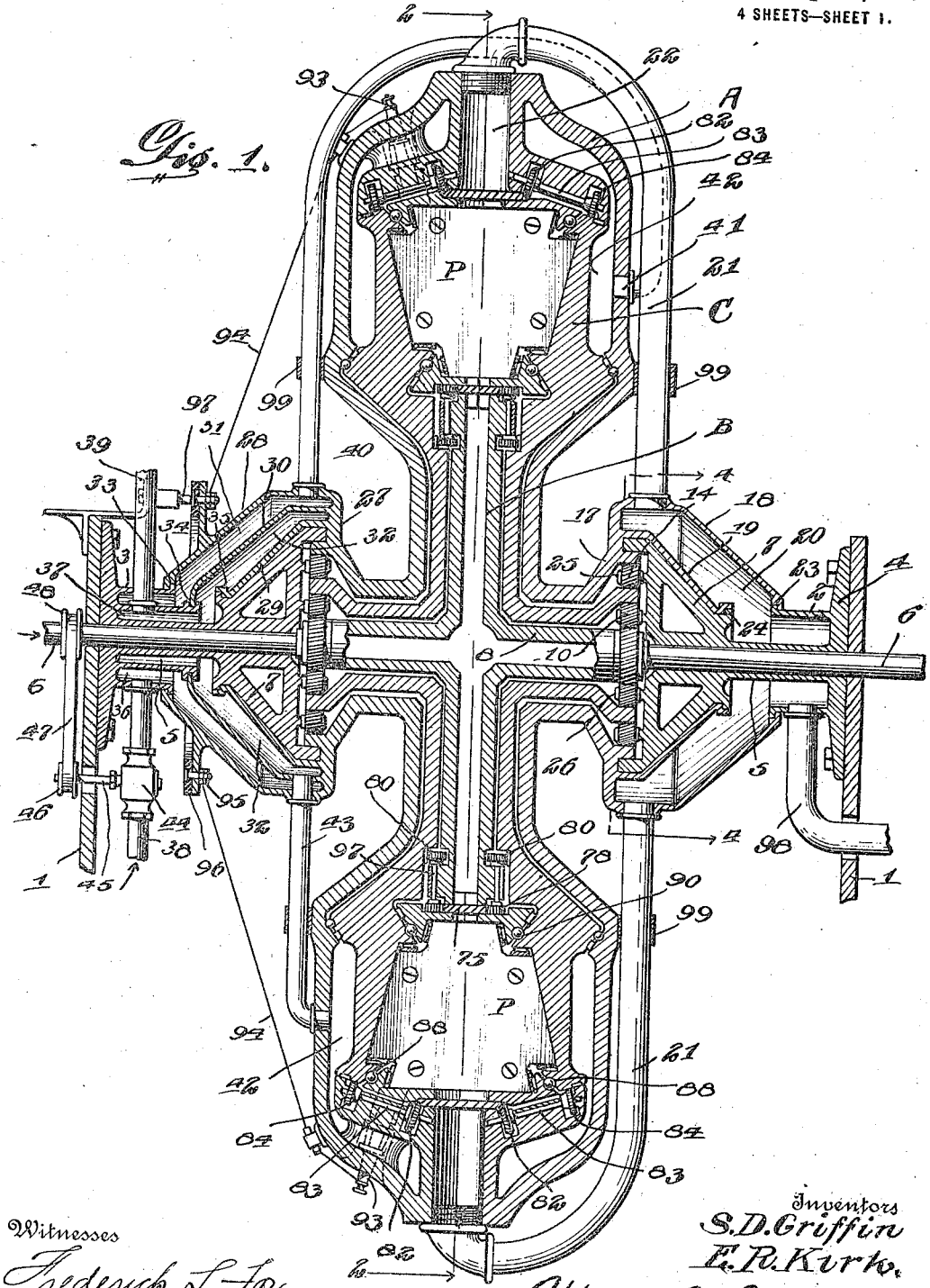

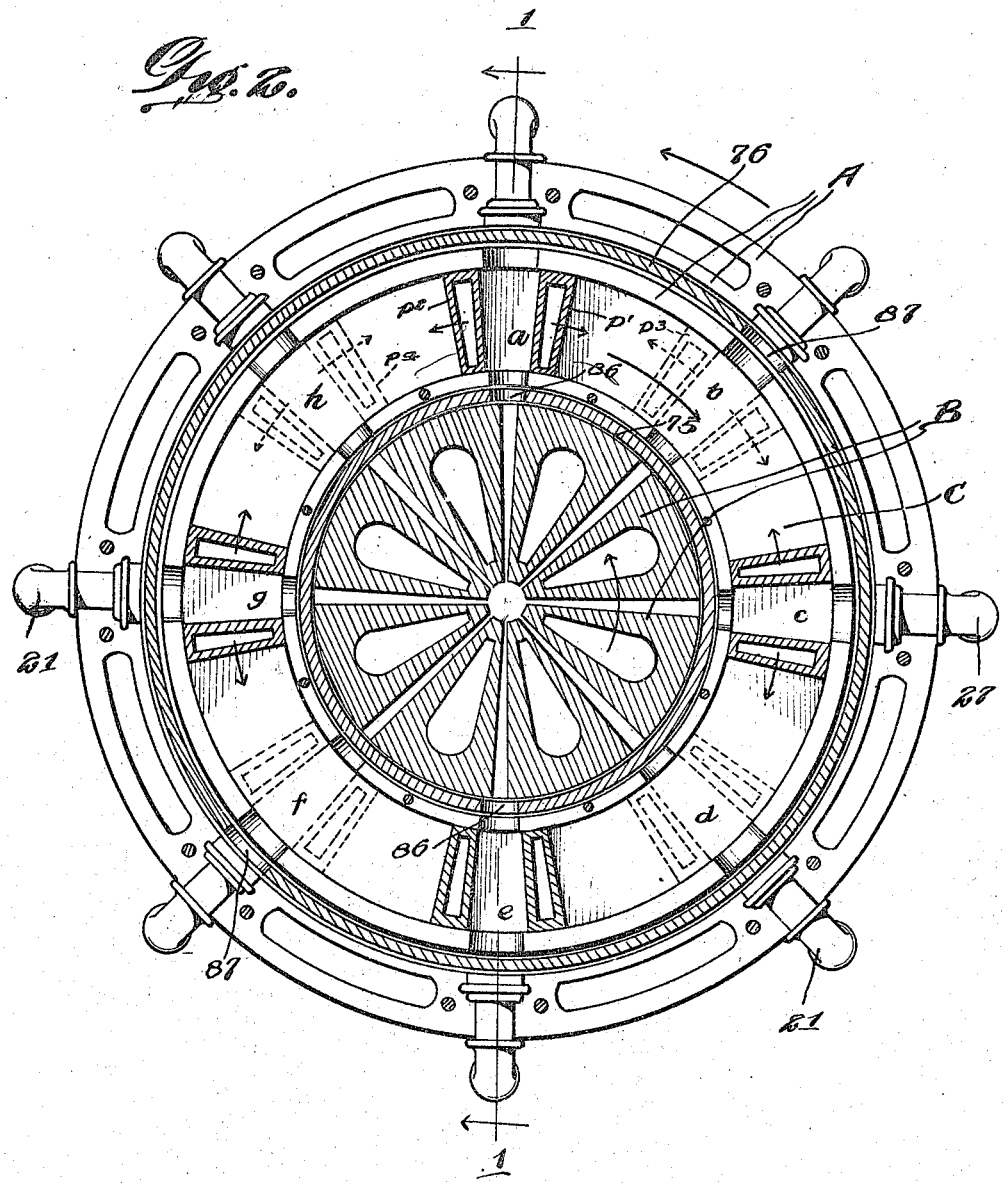

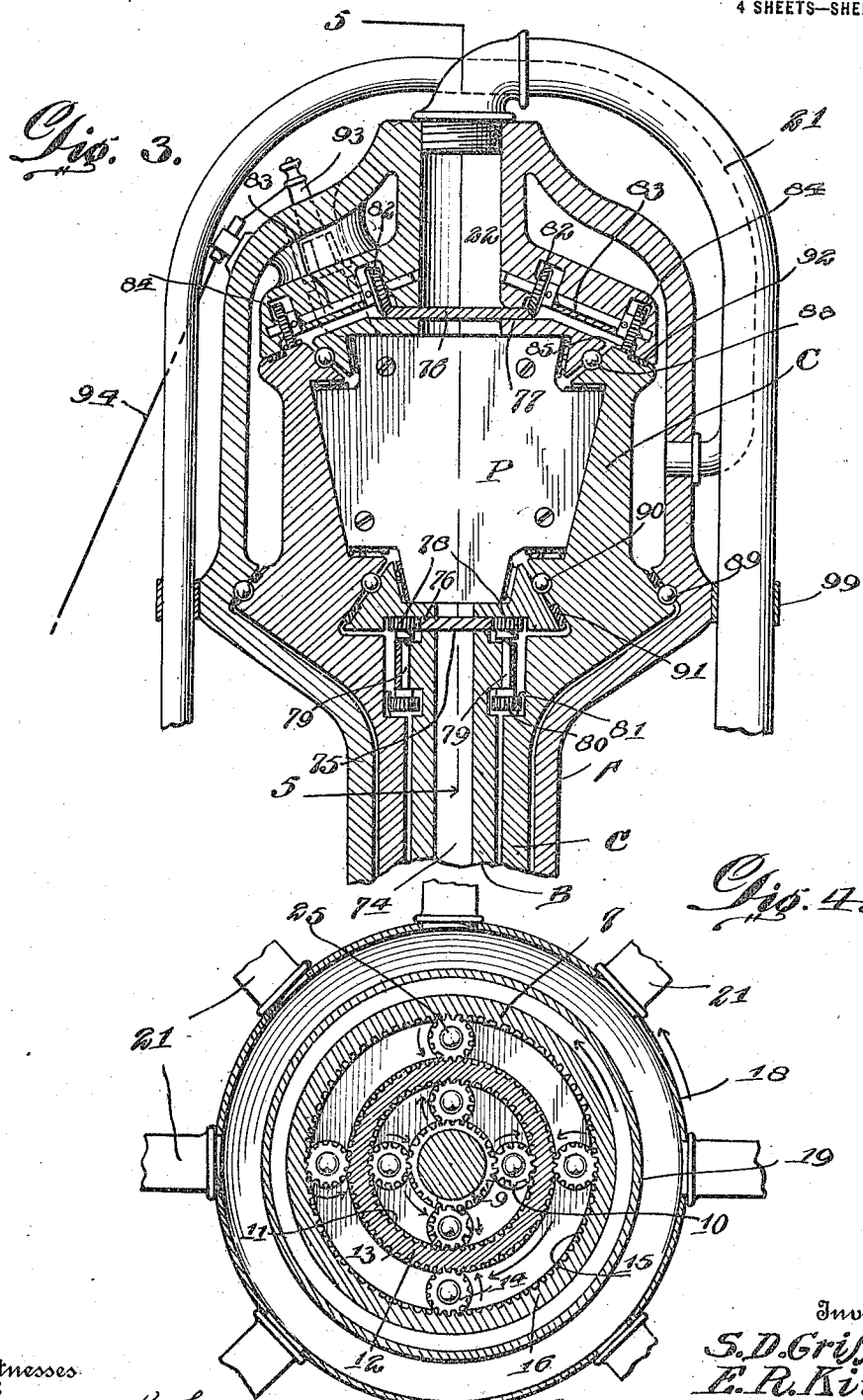

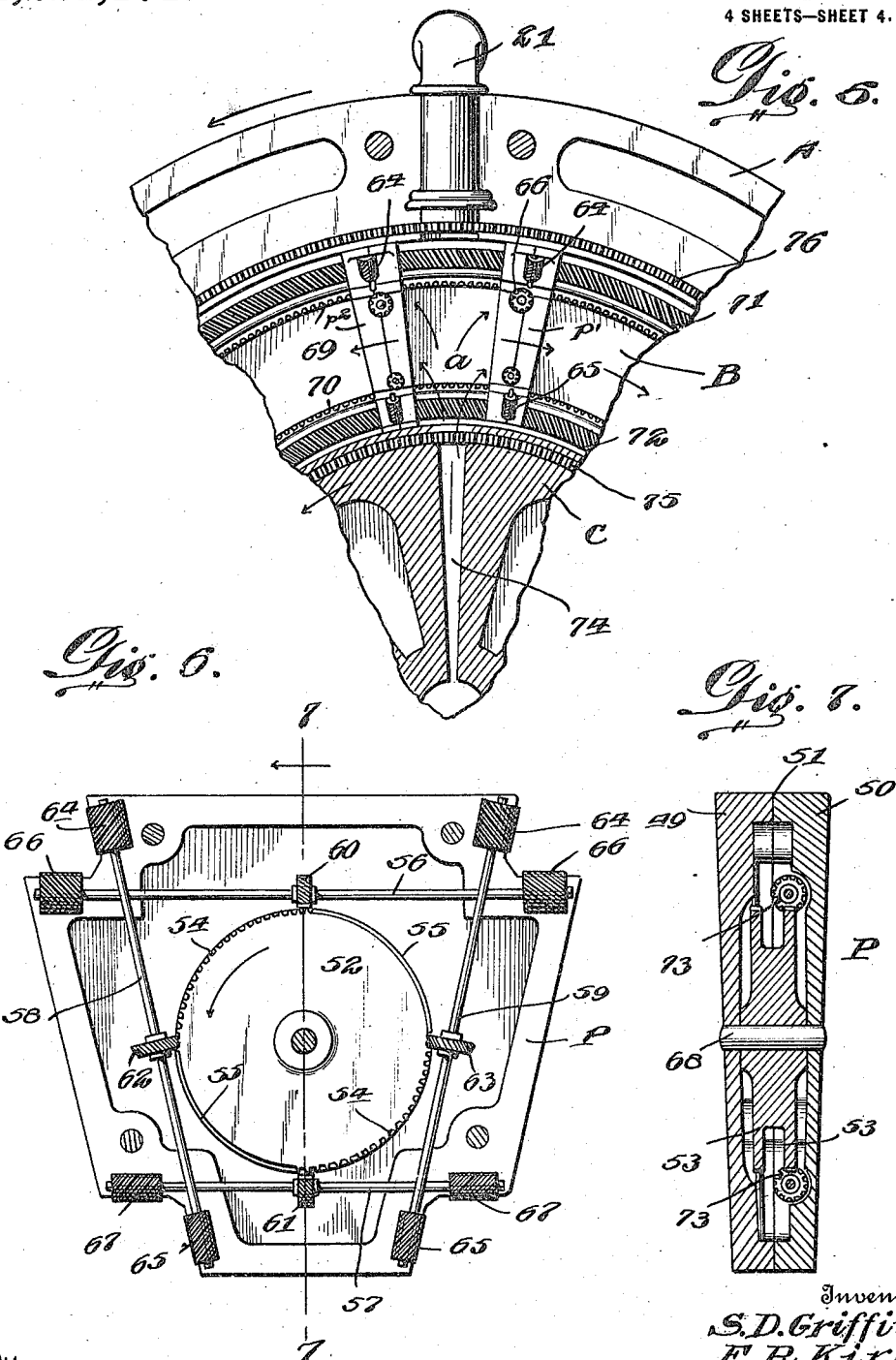

STANTON D. GRIFFIN AND EDWARD R. KIRK, OF MEMPHIS, TENNESSEE.

ROTARY INTERNAL-COMBUSTION ENGINE.

1,221,171. Specification of Letters Patent. Patented Apr. 3, 1917.

Application filed August 1, 1916. Serial No. 112,571.

*To all whom it may concern:*

Be it known that we, STANTON D. GRIFFIN and EDWARD R. KIRK, citizens of the United States, residing at Memphis, in the county of Shelby and State of Tennessee, have invented new and useful Improvements in Rotary Internal - Combustion Engines, of which the following is a specification.

This invention relates to rotary internal combustion engines and is especially designed as a motor for use in connection with craft of all kinds including wheeled vehicles and other land craft and also water and air craft.

One of the aims of the present invention is to produce an engine having a practically continuous torque, obtaining a plurality of impulses in each complete rotation thereof, and to reduce vibration to a minimum while utilizing the greater portion of the weight of the motor as a fly wheel.

A further object in view is to produce a motor which may be used as a power unit and combined with other power units of a like character and construction according to the total power required.

With the above and other objects in view, the invention consists in the novel construction, combination and arrangement of parts, as herein described, illustrated and claimed.

In the accompanying drawings:—

Figure 1 is a diametrical section through the engine taken on the line 1—1 of Fig. 2.

Fig. 2 is a section taken centrally of Fig. 1 on the line 2—2 of Fig. 1.

Fig. 3 is an enlarged fragmentary section taken on the same line as Fig. 1.

Fig. 4 is a section on the line 4—4 of Fig. 1.

Fig. 5 is a fragmentary section on the line 5—5 of Fig. 3.

Fig. 6 is an inside face view of one section of one of the pistons, the adjacent section of the piston being removed.

Fig. 7 is a section on the line 7—7 of Fig. 6.

Any suitable supporting structure or base may be employed for the engine hereinafter particularly described, 1 designating upright portions of such supporting frame or base. Secured fixedly to the supporting members 1 are two main bearing members 2 and 3 the same being shown as bolted to the members 1. Each of said bearing members comprises in addition to the base flange 4, a sleeve 5 to receive the adjacent end portion of the rotary engine shaft 6 as shown in Fig. 1. Each bearing member 2 and 3 also comprises a cone-shaped portion 7 at the inner end thereof which forms a support for the several rotors hereinafter described and also serves as a support for the stub shafts on which the pinions of the gearing hereinafter particularly referred to are journaled.

The main body of the engine comprises an outer rotor A, an inner rotor B and an intermediate rotor C. The intermediate rotor C turns in the opposite direction from the outer and inner rotors A and B. In order to bring about this operation of the rotors and equalize the movement thereof, the inner rotor B comprises a tubular shaft-like portion 8 one end of which communicates with a mixture inlet passage which extends longitudinally through one end of the shaft 6 where it may be connected to a suitable carbureter (not shown). The tubular shaft 8 of the inner rotor B is provided at its opposite ends with spur gears 9. Each of said gears 9 meshes with pinions 10 and these pinions in turn mesh with the internal gear face 11 of a flange 12 extending laterally from the intermediate rotor C. The flange 12 also has an outer gear face 13 which meshes with another series of pinions 14. These pinions in turn mesh with an internal gear face 15 on a laterally extending flange 16 of the outer rotor A. The construction just described is clearly shown in Figs. 1 and 4 and by reason thereof, the intermediate rotor C is driven in the opposite direction to that in which the outer and inner rotors A and B are driven. It is necessary to use positive gearing between the several rotors in order to insure the proper operation of the intake and exhaust valves hereinafter described.

In order to allow the several parts of the engine to be combined in the manner stated and as hereinafter described, each of the rotors A, B and C is preferably made of sectional construction or divided along the line 2—2 of Fig. 1. This enables the rotor C to be assembled around the rotor B and it also enables the rotor A to be assembled around the rotor C and the pistons and other parts hereinafter described. The rotor A is formed with enlarged hub extensions 17 and one of said hub sections is provided with an outer conical wall 18 and an inner conical wall 19 leaving between them an exhaust chamber 20 into which lead a circular series of exhaust pipes 21 communicating at their opposite ends with exhaust ports 22 extending radially through the outer portion of the rotor A. The outer wall 18 has a bearing at 23 on the main bearing member 2 while the inner wall 19 has a bearing at 24 on the conical portion 7 of the main bearing member 2, in fact the wall 19 bears throughout the greater portion of its extent on the part 7 of the main bearing member 2. The pinions 10 are journaled on stub shafts 26 projecting from the inner end of the part 7 and the pinions 14 are journaled on other stub shafts 25 on the part 7. The engine shaft 6 in addition to passing through the main bearing members 2 and the conical portions 7 thereof also passes through bearings in the frame members 1 all as shown in Fig. 1.

At the opposite side of the engine, the outer rotor A is formed with an enlarged hub portion 27 having an outer conical wall 28, an inner conical wall 29 and an intermediate conical wall 30 thereby leaving chambers 31 and 32 for any cooling agent such as water which is most commonly employed for cooling purposes. The wall 28 has a bearing at 33 on the bearing member 3 and the wall 30 has a bearing at 34 on said bearing member 3. The inner wall 29 has a bearing at 35 and also throughout the greater portion of its extent on the conical portion 7 of the bearing member 3. The bearing member 3 is formed with annular water spaces 36 and 37. Circulating pipes for the cooling agent enter the spaces 36 and 37, 38 designating one pipe which enters the space 36 and 39 designating another pipe which enters the space 37. Pipes 40 extend from the annular chamber 31 outwardly and around the periphery of the rotor A and communicate at 41 with the water jacket space 42. Other pipes 43 connect the space 42 with the inner annular water chamber 32. 44 designates a pump shown as incorporated in the pipe 38. The shaft 45 of said pump has a band pulley 46 from which a belt 47 extends around another pulley 48 fast on the engine shaft 6 whereby the pump is driven.

By referring to Fig. 2 it will be observed that the intermediate rotor C is formed with an annular compression and combustion chamber in which is arranged a circular series of pistons one of which is designated generally at P in Figs. 1 and 3. In Fig. 2 they are indicated by $p$, $p'$, etc., for the purpose of describing the operation of the engine hereinafter.

Referring now particularly to Figs. 3, 5, 6 and 7, it will be seen that each piston P is of hollow formation as best illustrated in Figs. 6 and 7, each piston comprising the sections 49 and 50 which meet on a substantially central line 51. The sections 49 and 50 are chambered out to receive the mechanism to be now described. Arranged centrally within the piston P is a mutilated locking gear 52 having two annular flanges 53 each of which is formed with two spur gear faces 54, and two longitudinally extending locking ribs 55. Each gear face 54 extends through approximately 90 degrees of a circle and each rib 55 is of approximately the same length as the gear face 54. The gear faces are arranged diametrically opposite each other as are also the ribbed faces 55.

Extending tangentially to the periphery of the locking gear 52 are outer and inner locking shafts 56 and 57. Other tangentially arranged side locking shafts 58 and 59 cross the shafts 56 and 57. The shafts 56 and 57 are provided about centrally thereof with spiral gears 60 and 61 adapted to coöperate with the gear faces 54 to impart an intermittent rotary movement to the gear 52. Other spiral pinions 62 and 63 on the shafts 58 and 59 coöperate in the same manner with the gear 52. The shafts 58 and 59 are provided at their outer ends with pinions 64 and at their inner ends with other pinions 65 of smaller diameter than the pinions 64. The shaft 56 is provided at its opposite extremities with pinions 66, and the shaft 57 is provided at its opposite ends with pinions 67. The gear 52 is journaled on a central pin 68 supported by the sections 49 and 50 of the piston as shown in Fig. 7. The sections 49 and 50 are also provided with suitable bearings for the several shafts 56, 57, 58 and 59 above referred to. The intermediate rotor C is formed with an annular gear face 69 with which the pinions 66 mesh and is also formed with another annular gear face 70 with which the pinions 67 mesh. The outer rotor A is provided with an annular gear face 71 with which the pinions 64 mesh and the inner rotor B is provided with a gear face 72 with which the pinions 65 mesh.

The mechanism just above described provides for locking each piston either to the intermediate rotor C or to the outer and inner rotors A and B. In the movement of each piston longitudinally of the annular compression and combustion chamber, the pinions on the shafts of the piston mesh with the gear faces on the rotors A, B and C and thereby the locking gear 52 is revolved. Each of the pinions 60, 61, 62 and 63 is formed with a locking groove 73 therein to receive one of the locking ribs 55. Therefore as the pinion 60, for example, is in gear with one of the toothed faces 54, the rib 55 is sliding through the locking slot or groove 73 of the pinion 63. At the same time pinion 61 is driving gear face 54, and pinion 62 is locked by one of the ribs 65. After a quarter turn of the gear 53, the pinions 62 and 63 previously locked by the ribs 55, are unlocked and the gear 52 is then driven by the pinions 62 and 63 while the pinions 60 and 61 are locked by the ribs 55. By reason of this locking and unlocking of the shafts and pinions, it will be understood that after the piston has moved to the right, for example, in the diagrammatic sectional view, Fig. 2, from the full line position $p'$ to the dotted line position $p^3$, the piston is locked to the outer and inner rotors A and B and after reaching the position $p^3$, it is unlocked from the members A and B and locked to the intermediate member C. In other words, at each limit of its movement, each piston is locked to that part of the engine moving in one direction and at the opposite limit of its movement it is locked to the other portion of the engine moving in the opposite direction, it being understood that when the shafts 58 and 59 are locked and the pinions 64 and 65 prevented from turning, the piston $p$ is locked to the outer and inner rotors A and B and when the shafts 56 and 57 are locked, the pinions 66 and 67 interlock with the gear faces 69 and 70 so that the piston is then locked to the intermediate rotor C.

Referring now to Figs. 1 and 3, the inner rotor B is provided with radially extending intake ports 74, which are intersected by an annular intake valve band 75 working in annular grooves or seats 76 in the intermediate rotor C. The exhaust ports 22 of the outer rotor A are intersected by an annular exhaust valve band 76 which works in grooves or seats 77 in the member A as best illustrated in Fig. 3. Both of these valve bands are also clearly shown in Fig. 2. The valve band 75 is actuated by means of pinions 78 at opposite sides thereof, said pinions being mounted on radially extending shafts 79 having also fast thereon pinions 80 which mesh with gear faces 81 within the oppositely lying sections of the intermediate rotor C as indicated in Fig. 3. The exhaust valve band 76 has its opposite edges formed with teeth with which mesh actuating pinions 82 on inclined shafts 83 also having fast thereon pinions 84 which mesh with gear faces 85 on the intermediate member C, the shafts 83 being journaled in bearings carried by the outer rotor A. The shafts 79 are journaled in bearings carried by the inner rotor B. Therefore as the several rotors operate in the directions indicated, the valve bands 75 and 76 are advanced so that at the proper intervals, inlet ports 86 in the intake valve band 75 are brought into line with the combustion chambers and also at the proper periods, exhaust ports 87 in the exhaust valve band 76 are brought into line with said combustion chambers and the exhaust ports 22 of the rotor A.

As indicated in Fig. 3, suitable antifriction bearings 88, 89 and 90 may be employed between the rotors A, B and C and also packing rings 91 and 92. The ignition system may embody a series of plugs 93 one for each combustion chamber from which wires 94 lead to the binding posts 95 of a commutator ring 96 with which coöperates a contact or wiper 97, whereby sparks are created in the combustion chambers at the proper intervals which may be regulated by the set of the commutator 96. 98 represents an exhaust pipe leading off from the exhaust chamber 20 hereinabove described. 99 represents eyes through which the pipes 21, 40 and 43 pass to eliminate any vibration of said pipes in relation to the rotor A.

The operation of the engine may be described as follows. It being understood that the mixture is received through the tubular end of the shaft 6 into the tubular shaft portion 8 of the inner rotor B, the mixture passes radially outward through the ports 74 in reaching the annular compression and combustion chamber shown in Fig. 2 which is partly a sectional view and partly diagrammatic. Starting with the port 86 of the intake valve band 75 in the position shown at the top of Fig. 2 or, in other words, in line with the upper combustion chamber $a$ and with the pistons $p'$ and $p^2$ in the position shown, the piston $p'$ being locked, for example, to the intermediate rotor C, and the piston $p^2$ being locked to the rotors A and B, the said pistons move apart until they reach the respective positions $p^3$ and $p^4$ indicated by dotted lines in Fig. 2. In such movement away from each other, a charge of explosive mixture is admitted to the combustion chamber $a$. When the pistons $p'$ and $p^2$ reach the positions $p^3$ and $p^4$, the piston $p'$, by the means above described, is unlocked from the rotor C and locked to the rotors A and B while the piston $p^2$ is unlocked from the rotors A and B and locked to the intermediate rotor C. Thereupon, the pistons $p'$ and $p^2$ start to move toward each other again thereby compressing the mixture in the combustion chamber $a$. At this point again the piston $p'$ is unlocked from A and B and locked to C while the piston $p^2$ is unlocked from C and locked to A and B. Just at this moment the compressed mixture is ignited by the respective plug and the pistons $p'$ and $p^2$ are driven away from each other on their working strokes. Upon their return movement toward each other, the burned gases are forced outwardly through one of the ports 87 of the exhaust valve band 76 which has by that time moved into registry with the combustion chamber $a$.

In the preferred embodiment of the invention as illustrated in the diagrammatic view, Fig. 2, there are four sets of pistons and eight combustion chambers. This enables the four cycles of operation to be carried out twice in the length of the annular compression and combustion chamber. For instance, when the pistons at opposite sides of the combustion chamber $a$ are in intaking position, the chamber $b$ is exhausting, the chamber $c$ compressing and the chamber $d$ firing. The chamber $e$ is intaking, the chamber $f$ exhausting, the chamber $g$ compressing and the chamber $h$ firing.

We claim:—

1. The combination with a plurality of rotors turning in opposite directions on a common axis, of pistons relatively movable toward and away from each other, and means whereby each piston while moving in one direction drives one rotor and while moving in the opposite direction drives another rotor.

2. The combination with a plurality of rotors turning in opposite directions on a common axis, of pistons relatively movable toward and away from each other, and means whereby each piston while moving in one direction is attached to one rotor and while moving in the opposite direction is attached to another rotor.

3. The combination with a plurality of rotors turning in opposite directions on a common axis, of pistons relatively movable toward and away from each other, and means whereby each piston while moving in one direction is locked to one rotor and while moving in the opposite direction is locked to another rotor.

4. The combination with a plurality of rotors turning in opposite directions on a common axis, of pistons relatively movable toward and away from each other, and means whereby each piston while moving in one direction is attached to one rotor and while moving in the opposite direction is attached to another rotor, the arrangement being such that when one piston is attached to one rotor the coöperating piston is attached to an oppositely moving rotor.

5. The combination with a plurality of rotors turning in opposite directions on a common axis, of pistons relatively movable toward and away from each other, and means whereby each piston while moving in one direction drives one rotor and while moving in the opposite direction drives another rotor, said rotors being geared together to turn simultaneously in opposite directions.

6. The combination with a plurality of rotors turning in opposite directions on a common axis, of pistons relatively movable toward and away from each other, and means whereby each piston at one limit of its movement is locked to one rotor and unlocked from the other, and the same unlocking and locking operation effected at the other limit of its movement.

7. The combination with a plurality of rotors turning in opposite directions on a common axis, of pistons relatively movable toward and away from each other, and means whereby each piston at one limit of its movement is locked to one rotor and unlocked from the other, and the same unlocking and locking operation effected at the other limit of its movement, there being four strokes of each piston in one complete cycle of the engine.

8. The combination with a plurality of rotors turning in opposite directions on a common axis, of pistons relatively movable toward and away from each other, and means whereby each piston at one limit of its movement is locked to one rotor and unlocked from the other, and the same unlocking and locking operation effected at the other limit of its movement, there being four strokes of each piston in one complete cycle of the engine, and a plurality of such cycles in one complete rotation of the rotors.

9. The combination with a plurality of rotors turning in opposite directions on a common axis, of pistons relatively movable toward and away from each other, means whereby each piston while moving in one direction is locked to one rotor and while moving in the opposite direction is locked to another rotor, said locking means embodying rack faces on the rotors, pinions on each piston meshing with said rack faces, and means carried by said piston for alternately locking and unlocking said pinions.

10. The combination with a plurality of rotors turning in opposite directions on a common axis, of pistons relatively movable toward and away from each other, means whereby each piston while moving in one direction is locked to one rotor and while moving in the opposite direction is locked to another rotor, said locking means embodying rack faces on the rotors, pinions on each piston meshing with said rack faces, pinion shafts, other pinions on said shafts, and a locking gear having a toothed portion to mesh with the last named pinions and also having a locking rib to engage and lock the last named pinions.

In testimony whereof we affix our signatures.

STANTON D. GRIFFIN.
EDWARD R. KIRK.

Copies of this patent may be obtained for five cents each, by addressing the "Commissioner of Patents, Washington, D. C."